United States Patent [19]
Raz

[11] 4,281,543
[45] Aug. 4, 1981

[54] HAND SHOWER AND TEMPERATURE INDICATING UNIT

[76] Inventor: Zeev Raz, 17 Keren Hayesod St., Beersheva, Israel

[21] Appl. No.: 30,247

[22] Filed: Apr. 16, 1979

Related U.S. Application Data

[63] Continuation-in-part of Ser. No. 823,558, Aug. 11, 1977, Pat. No. 4,161,881.

[30] Foreign Application Priority Data

Oct. 27, 1975 [IL] Israel .................................. 48730

[51] Int. Cl.³ ........................................... G01K 13/02
[52] U.S. Cl. .................................. 73/343 R; 73/349; 73/356
[58] Field of Search .................. 73/343 R, 349, 351, 73/356; 239/588

[56] References Cited

U.S. PATENT DOCUMENTS

| | | | |
|---|---|---|---|
| 1,535,536 | 4/1925 | MacDonald | 73/356 |
| 2,112,648 | 3/1938 | Brown | 73/343 R |
| 2,171,992 | 9/1939 | Rantine | 73/343 R |
| 2,534,378 | 12/1950 | Schlaich | 73/349 |
| 2,626,524 | 1/1953 | Harman | 73/349 |
| 2,645,116 | 7/1953 | Baxter | 73/343 R |
| 3,581,568 | 6/1971 | Pfefer | 73/343 R |
| 3,635,086 | 1/1972 | Beruck | 73/343 R |
| 3,637,143 | 1/1972 | Shames | 239/588 |
| 3,651,695 | 3/1972 | Brown | 73/356 |
| 3,960,016 | 6/1976 | Symmons | 73/343 R |
| 4,030,360 | 6/1977 | Fortune | 73/349 |
| 4,132,464 | 1/1979 | Maeno | 73/356 |
| 4,156,365 | 5/1979 | Heinmets et al. | 73/356 X |

*Primary Examiner*—Daniel M. Yasich
*Attorney, Agent, or Firm*—Lawrence Rosen

[57] ABSTRACT

A hand shower and temperature indicating unit is provided. The unit includes a shower head consisting of a water chamber having a perforated water outlet surface, a rigid water conduit section serving as the handle for said unit and integrally attached at one end thereof to a side surface of said chamber and having at the free end thereof means for attachment to a water supply line and a liquid crystal temperature indicating means positioned within a compartment formed by a recess in and extending along a wall surface of said unit wherein said compartment includes an interior heat transfering wall positioned along the flow path of the water passing through said unit and in contact therewith.

14 Claims, 5 Drawing Figures

HAND SHOWER AND TEMPERATURE INDICATING UNIT

This application is a continuation-in-part of an application entitled a Hand Shower and Temperature Indicating Unit, Ser. No. 823,558 filed Aug. 11, 1977, now U.S. Pat. No. 4,161,881.

The present invention relates to hand shower units and more particularly to a hand shower unit having a temperature indicating means integrally attached thereto.

The problem of temperature regulation of hot water in hand shower units is a long recognized one for which there heretofore has not been provided any satisfactory simple mechanical solution. It is generally known that sensitivity to temperature is subjective to each individual and, therefore, for example, adults often encounter difficulty in regulating and adjusting water temperature to be suitable for washing babies, young children or elderly people.

Another difficulty, often encountered by people preparing or regulating water for baths or showers using a hand shower unit is that the temperature of the incoming water can fluctuate through wide extremes of temperatures when supplied by a boiler system for a period of time.

It is, therefore, a broad object of the invention to provide accurate means by which the actual temperature of water flowing out of a hand shower unit can be constantly monitored and determined and whereby, accordingly, the temperature of the water can be adjusted to the desired temperature. A more specific object is to provide a hand shower unit with a built-in temperature-sensitive means adapted to indicate the temperature of the water flowing therethrough.

According to the invention, there is provided a hand shower and temperature indicating unit comprising:

a shower head consisting of a water chamber having a perforated water outlet surface;

a rigid water conduit section serving as the handle for said unit and integrally attached at one end thereof to a side surface of said chamber and having at the free end thereof means for attachment to a water supply line; and a liquid crystal temperature indicating means positioned within a compartment provided along a wall surface of said unit wherein said compartment comprises an interior heat transfering wall positioned along the flow path of the water passing through said unit and in contact therewith.

In especially prefered embodiments of the present invention said liquid crystal temperature indicating means is positioned within a recess provided in the outer surface of said unit and the inner surface of said recess comprises an interior heat transfering wall positioned along the flow path of the water passing through said unit and in contact therewith.

In U.S. Pat. No. 2,112,648 and U.S. Pat. No. 3,635,086 there are described temperature measuring and indicating devices adapted respectively to be attached to a faucet to measure the temperature of fluid discharging therefrom or to be connected in a pipe-line system to measure the temperature of water passing therethrough.

Similarly in U.S. Pat. Nos. 2,171,992 and 3,960,016 there are described water mixing valves having temperature indicators built therein.

Said patents, however, neither teach nor relate to a combined hand shower and temperature regulating unit of the type forming the subject matter of the present invention.

In U.S. Pat. No. 2,645,116 there is described and claimed a specific type of combination bath spray device and temperature indicator, however, the unit of the present invention differs from said device with regard to many important characterizing structural features as described hereinafter which are neither taught nor suggested by said patent.

More specifically said patent describes and claims a hollow spray head of yieldable resilient material having a transverse wall adjacent to its inner end terminating in an elongated neck arranged centrally of said wall and having a water inlet opening extending therethrough, the outer end of said neck being connectible to a water hose, a handle comprising a rigid transparent elongated sleeve carried by said head surrounding and spaced from said neck and water hose, said sleeve extending a substantial distance along the water hose and affording between the hose and said sleeve a well of a length and width sufficient to house a thermometer tube, and a spray plate secured at the outer end of the head, said hollow spray head including a chamber between the spray plate and the water inlet opening and said transverse wall having an enlargement projecting into said chamber with a thermometer-receiving opening extending through said enlargement and transverse wall whereby a thermometer may be located with its bulb in said chamber and its tube arranged in said well between said water hose and said elongated sleeve and parallel thereto.

As will be realized from said description and as stated specifically in said patent, the device does not comprise an integral water conduit which serves as the handle for the device and which is adapted to be simply attached to a water supply line as in the self-contained unit of the present invention and instead requires a complicated assembly of parts involving passing a water hose through an elongated hollow transparent sleeve which serves as handle for the device and then attaching said water hose to the neck of the spray head followed by further complicated assembly steps.

In addition, as described, said device comprises a hollow spray head to which a rigid transparent elongated sleeve is attached to act as handle wherein said sleeve is of sufficient diameter to concentrically surround a standard water hose while leaving sufficient clearance for the thermometer tube to be positioned inside said hollow sleeve between the inner wall thereof and the outer wall of said water hose.

This construction results in a handle of unnecessary and cumbersome thickness which is consequently uncomfortable for easy grasping in use as a hand shower for which it is purportedly designed and in the sleeve of which dirt and bacteria tend to accumulate.

Furthermore, since said shower head is constructed with its water inlet opening opposite its spray plate and with the temperature sensitive bulb of the thermometer positioned therebetween when the shower head is operated at low pressure, as is often the case when bathing infants, the water emerging from the water inlet impinges on the thermometer bulb and is deflected therefrom thereby causing an uneven spray of water through said spray plate due to the interference of said thermometer bulb with the direction of water flow and spray pattern.

In U.S. Pat. No. 2,626,524 there is described another specific type of a shower bath spray head thermometer which patent describes and claims a combined bath spray head and temperature indicator, comprising an angular fluid conducting body, one leg thereof being provided at one end with means for connection to a water pipe, and other leg terminating in a flared outwardly directed discharge nozzle, a perforated cap covering said discharge nozzle, a thermometer having a dial and pointer mounted on the front of said body near the junction of said legs, and having a bi-metallic thermal responsive element extending axially within the first leg of said body.

As will be noted in said prior art device, the bi-metallic thermal responsive element extends axially, inside a surrounding tube, within the first leg of said body and said bi-metallic strip and surrounding tube are situated directly in the flow path within said cylindrical leg portion. As described, said temperature indicating unit will initially and increasingly interfere with and obstruct the water flow through said conduit leg as scale tends to form along the surface thereof. Consequently, the flow of water will be obstructed requiring disassembly and/or replacement of the entire unit.

These and other disadvantages of the prior art devices are overcome by the novel hand shower unit of the present invention as described hereinafter, which unit is characterized by a temperature indicating means which does not interfere with the flow of water or block any of the shower spray holes in contradistinction to said two prior art devices in which each has a temperature sensitive element positioned in an obstructing position in the flow path of water between the inlet port and the spray holes.

Furthermore, as will be realized, the liquid crystal temperature indicating means of the present invention is not prone to possible breakage as is the liquid tube thermometer of U.S. Pat. No. 2,645,116 and is also both much less expensive and less bulky than the bi-metal thermometer of U.S. Pat. No. 2,626,524.

While the invention will now be described in connection with certain preferred embodiments with reference to the following illustrative figures so that it may be more fully understood, it is stressed that the particulars shown and described are by way of example and for purposes of illustrative discussion only and are presented in the cause of providing what is believed to be the most useful and readily understood description of the principles and conceptual aspects of the invention. In this regard no attempt is made to show structural details of the hand shower and its constituent parts in more detail than is necessary for a fundamental understanding of the invention, the description taken with the drawings making apparent to those skilled in the art how the several forms of the invention may be embodied in practice.

Figure 1:
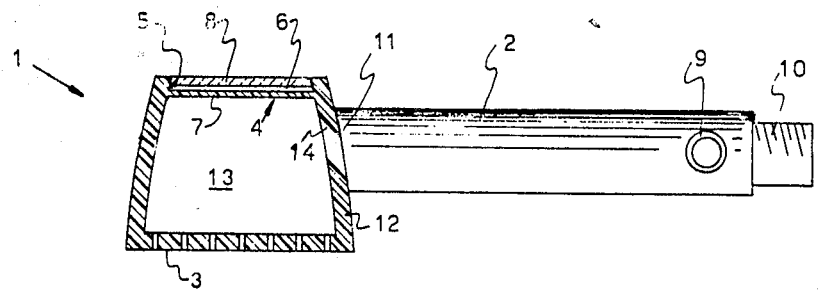
FIG. 1 shows a hand shower unit, partly in cross-section, constructed in accordance with the invention.

Referring first to FIG. 1, there is shown a hand shower and temperature indicating unit according to the present invention comprising a shower head 1 affixed to a rigid water conduit section 2. The shower head includes a perforated surface 3 and a rear wall surface 4 wherein the outer surface of said rear wall surface 4 is provided with a recess 5 in which recess there is positioned a liquid crystal temperature indicating means 6.

Said rear wall surface comprises a heat transferring wall 7 and said liquid crystal temperature indicating means 6 is preferably pressed against said heat transferring wall 7, which wall constitutes the interior wall of said recess 5, by a transparent cover 8 which is adapted to tightly seal said recess and through which the temperature can be viewed. Said conduit section and said shower head are preferably of non-transparent material, such as predominantly rigid plastic, rubber or the like heat insulating material, which can be colored to match the decor of the bathroom in which the unit is to be installed. Alternatively both of said unit parts can be made of metal such as aluminum, nickel or even gold-plated metal.

The conduit section 2 may advantageously be provided with a push-button water cut-off member 9 and preferably has a screw threaded end portion 10 for facilitating its attachment to a water hose or pipe (not shown).

Said push-button water cut-off member 9 is especially preferred since it adds to the temperature sensing structure of the unit the additional function of enabling the momentary cessation of flow through said unit whereafter said unit can be dipped into a filled or filling bath tub to provide information with regard to the composite temperature of the water in the bath being filled, which composite water temperature will generally vary from the temperature of the water flowing through said unit at any given time.

As will be noted, said rigid water conduit section 2 is adapted to serve as the handle for said unit and is integrally attached at one end thereof 11 to the side surface 12 of the water chamber 13 of the shower head 7. Said conduit section has at said one end 11 means which in the present embodiment constitute at upwardly angled outlet portion 14, adapted to direct a water flow towards the heat transferring wall 7 of the back surface of said shower head 1.

The heat transferring wall can be of plastic formed as an integral part of an entire plastic molded unit in which case said heat-transferring wall 4 will preferably be thinner than the other walls of said unit, e.g., said wall could be about 1 mm thick or less while the remaining walls could be about 5–6 mm thick, since, as is known, the normal plastic walls of a hand shower are purposely made thick enough so as not to transfer heat which could burn the hand of the user.

Alternatively, said heat transferring wall could comprise a metal section or panel, inserted in a plastic unit during the molding process to avoid later leakage, in which case it is preferred that the heat-transferring wall section of said inner surface of said recess be at least co-extensive with the temperature indicating sections of said liquid crystal temperature indicating means.

While in the preferred embodiments of the present invention as described herein, the liquid crystal temperature indicating means are positioned within a recess provided in the outer surface of said unit wherein the inner surface of said recess comprises an interior heat transferring wall positioned along the flow path of the water passing through said unit and in contact therewith, it will be realized that a recess can also be provided along the inner surface of said unit to house said thermometer, in which case the inner wall of said recess would constitute an outer wall of said unit and would be made transparent for viewing said temperature indicating means therethrough.

Irrespective of the exact structure used, it will be realized that the provision of a liquid crystal temperature indicating means positioned within a compartment provided along a wall surface of said unit wherein said compartment comprises an interior heat transferring wall positioned along the flow path of the water passing through said unit and in contact therewith, assures that said means does not interfere with the flow of water or block any of the shower spray holes in perforated surface 3.

Furthermore, the fact that the shower head 1 and conduit section 2 form an integral unit adapted to be attached at end portion 10 to an external water hose provides for ease of installation and use as well as for the provision of a compact and comfortably holdable unit.

Thus, the embodiment described with reference to FIG. 1 is one possible preferred embodiment in which the hand shower and temperature indicating unit comprises a shower head 1 consisting of a water chamber 13 having a perforated water outlet surface 3 and an opposite rear wall surface 4; a liquid crystal temperature indicating means 6 positioned within a recess 5 provided in the outer surface of said rear wall surface 4 of said chamber opposite to said perforated water outlet surface 3 and which recess comprises a heat transferring inner wall 7 and a rigid water conduit section 2 serving as the handle for said unit and integrally attached at one end 11 thereof to the side surface 12 of said chamber 13 at a position between said heat transferring rear wall 7 and said perforated water outlet surface 3, said conduit section having at said one end means 14 adapted to direct a water flow towards said heat transferring rear wall 7 away from said perforated water outlet surface 3 and having at the free end thereof means 10 for attachment to a water supply line.

Figure 2:
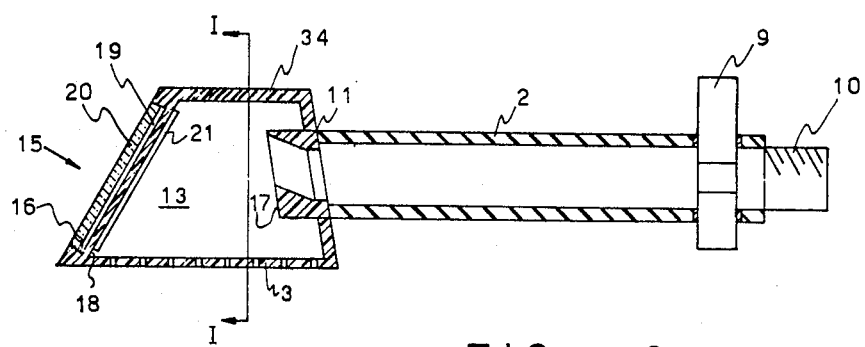
FIG. 2 is a cross-sectional view of a different embodiment of a hand shower according to the invention.
Figure 3:
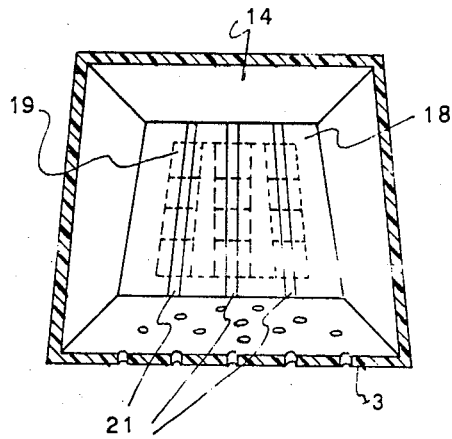
FIG. 3 is a cross-sectional view along line I—I of FIG. 2 showing the inside of an angularly disposed side wall of said unit.

Referring now to FIGS. 2 and 3 there are shown two views of an especially preferred embodiment of the present invention in which figures like numerals have been used to indicate like parts as indicated in FIG. 1.

As seen in this embodiment, said water chamber 13 comprises a rear wall 34 and an angularly disposed side wall 15 extending between said rear wall and said perforated water outlet surface 3. A recess 16 is provided in said angularly disposed side wall 15, and the conduit section 2 has at said one end 11 means 17 adapted to direct a water flow towards the heat-transferring wall 18 of said recess away from said perforated water outlet surface. As a possible variation of the embodiment of FIG. 1, however applicable to both embodiments, said conduit section 2 is shown as being provided at said one end 11 with an end portion 17 inside said chamber 13 adapted to direct a water flow towards said heat transferring wall 18 of said recess away from said perforated water outlet surface.

As in the first described embodiment, a liquid crystal temperature indicating means 19 is preferably pressed against said heat transferring wall 18 by means of a transparent cover 20 which is adapted to tightly seal said recess 16 and through which the temperature can be viewed.

As stated, when said heat transferring wall 18 is made of thin plastic integrally formed as part of an entire molded shower unit, said thin wall is preferably provided with one or more reinforcing strips 21 which are more clearly seen with reference to FIG. 3.

Said reinforcing strips are preferably of heat conducting material, such as metal, to increase the sensitivity of the unit by augmenting the heat transfer through the thin wall 18. To avoid the possibility of said strips interfering with the flow of water, said reinforcing strips 21 are preferably substantially aligned with the direction of flow of water in said unit, and as will be realized, said reinforcing strips are primarily intended to prevent the possibility of said thin wall breaking if the unit is dropped.

Because of the relatively large surface available along said angularly disposed side wall 15, it is possible to provide in said recess a liquid crystal temperature indicating means having a wide range of possible temperature readings, e.g., twelve different readings provided in a possible array of three columns and four rows as indicated in broken lines.

Since under present technology liquid crystal indicating means are available which are water-proof, they are preferred, though not essential, for use in the present invention.

Figure 4:
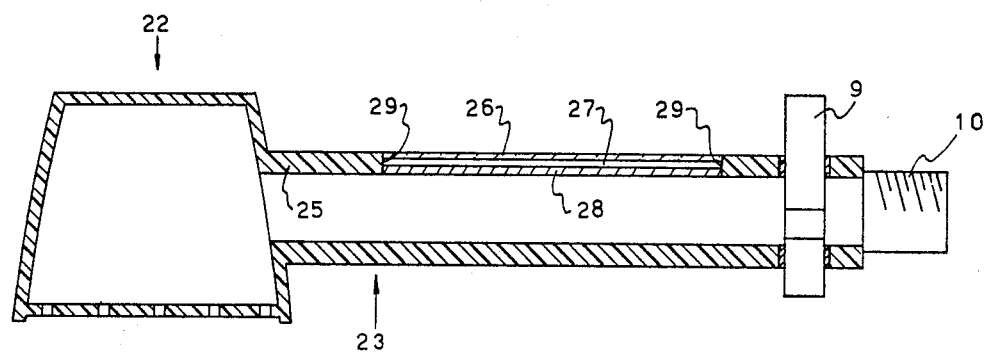
FIG. 4 is a cross-sectional view of a different embodiment of a hand shower unit according to the invention.
Figure 5:
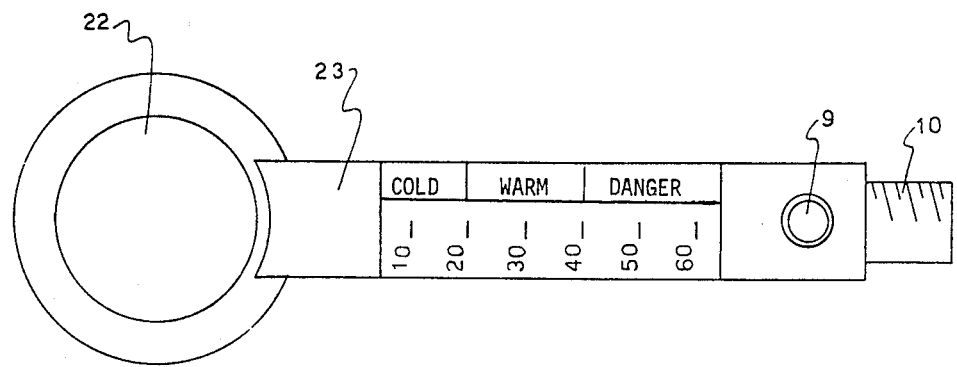
FIG. 5 is a plane view of the hand shower unit of FIG. 4 more clearly showing the temperature indicating means.

Turning now to FIGS. 4 and 5, where a different embodiment of the unit according to the invention is shown, it is seen that there is attached to a shower head 22 a rigid water conduit section 23 having a walled recess 24 extending along at least a portion of the back outer surface 25 thereof. The recess 24 may optionally be fitted with a water-tight transparent cover 26 and is adapted to house a liquid crystal temperature indicating means 27 extending parallel to the longitudinal axis of said conduit 23.

As in the other embodiments, said recess 24 is provided with a thin heat transferring wall 28 which can be made of thin plastic or metal.

It should be noted than even when said recess 24 is provided along the outer surface of said conduit 23 as opposed to being provided as preferred in the rear or side walls of the shower head, said walled recess does not appreciably increase the circumference of the handle since the additional area occupied by the projecting walls 29 surrounding and forming said recess 24 extends only in one direction from the conduit and does not involve a corresponding increase in area along the sides and bottom thereof. As can be seen in FIG. 4, temperature read-outs in accordance with the liquid crystal technology can be provided, e.g., word or letter readouts for cold, warm and danger as well as more specific read-out in degrees.

While particular embodiments of this invention have been described, it will be evident to those skilled in the art that the present invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A hand shower and temperature indicating unit comprising:
   a shower head consisting of a water chamber having a perforated water outlet bottom surface and wall surfaces;
   a rigid water conduit section made predominantly of rigid plastic, rubber or the like that insulating materials and serving as the handle for said unit and integrally attached at one end thereof to a side wall surface of said chamber and having at the free end thereof means for attachment to a water supply line; and
   a liquid crystal temperature indicating means positioned within a compartment comprising a recess in and extending along a wall surface of said unit, said compartment comprising an interior heat transferring wall positioned along the flow path of the water passing through said unit to be directly contacted thereby.

2. A hand shower and temperature indicating unit according to claim 1 wherein said recess is provided in an outer wall surface of said unit and the inner surface of said recess comprises said interior heat transferring wall.

3. A hand shower and temperature indicating unit comprising:
   a shower head consisting of a water chamber having a perforated water outlet bottom surface, a rear wall, and at least one angularly disposed side wall extending between said rear wall and said perforated water outlet bottom surface;
   a rigid water conduit section serving as the handle for said unit and integrally attached at one end thereof to a side surface of said chamber, and having at the free end thereof means for attachment to a water supply line;
   a liquid crystal temperature indicating strip means positioned within a compartment comprising an elongated recess provided between a transparent outside wall and a heat transferring interior wall extending on one of said side walls of said unit, said one wall of said compartment comprising said interior heat transferring wall positioned along the flow path of the water passing through said unit to be directly contacted thereby; and
   the conduit section has at other end means adapted to angularly direct a water flow towards said heat transferring wall of said recess away from said perforated water outlet bottom surface.

4. A hand shower and temperature indicating unit according to claim 3 wherein said heat-transferring wall section of said inner surface of said recess is at least co-extensive with the temperature indicating sections of said liquid crystal temperature indicating means.

5. A hand shower and temperature unit according to claim 3, wherein said
   shower head consists of a water chamber having said perforated water outlet surface and an opposite rear wall surface;
   said recess being provided in the outer surface of said rear wall surface of said chamber, which recess comprises a heat transferring inner wall; and
   said rigid water conduit section being integrally attached at one end thereof to the side surface of said chamber at a position between said heat transferring rear wall and said perforated water outlet surfaces, said conduit section having at said one end means adapted to direct a water flow towards said heat transferring rear wall away from said perforated water outlet surface and having at the free end thereof means for attachment to a water supply line.

6. A hand shower and temperature unit according to claim 3 wherein said water chamber comprises a rear wall and an angularly disposed side wall extending between said rear wall and said perforated water outlet surface, said recess is provided in said angularly disposed side wall and said conduit section has at said one end means adapted to direct a water flow towards said heat-transferring wall of said recess away from said perforated water outlet surface.

7. A hand shower and temperature indicating unit according to claim 3 wherein said conduit section is provided at said one end with an end portion inside said chamber adapted to direct a water flow towards said heat transferring wall of said recess away from said perforated water outlet surface.

8. A hand shower and temperature indicating unit according to claim 3 wherein said heat-transferring wall is thinner than the other walls of said unit.

9. A hand shower and temperature indicating unit according to claim 8 wherein said thin wall is provided with reinforcing strips.

10. A hand shower and temperature indicating unit according to claim 9 wherein said reinforcing strips are substantially aligned with the direction of flow of water in said unit.

11. A hand shower and temperature indicating unit according to claim 9 wherein said strips are of heat conducting material.

12. A hand shower and temperature indicating unit according to claim 3 wherein said liquid crystal temperature indicating means is water proof.

13. A hand shower and temperature indicating unit according to claim 3 wherein said conduit is provided with a push-button water cut-off member.

14. A hand shower and temperature indicating unit according to claim 3 wherein said recess is provided with a transparent cover.

* * * * *